(12) United States Patent
Elliott et al.

(10) Patent No.: US 8,910,289 B1
(45) Date of Patent: Dec. 9, 2014

(54) AUTOMATIC HARDENING OF AN UNCOMPROMISED COMPUTER NODE

(75) Inventors: Ian A. Elliott, Fort Collins, CO (US); John R. Diamant, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2444 days.

(21) Appl. No.: 11/669,208

(22) Filed: Jan. 31, 2007

(51) Int. Cl.
*G06F 12/14* (2006.01)

(52) U.S. Cl.
USPC .......................................... 726/25; 713/188

(58) Field of Classification Search
CPC . G06F 21/577; G06F 21/566; H04L 63/1433; H04L 63/1441; H04L 63/1416; H04L 63/145

USPC ............................................ 726/25; 713/188
See application file for complete search history.

(56) References Cited

U.S. PATENT DOCUMENTS

| | | | |
|---|---|---|---|
| 7,065,657 B1 | 6/2006 | Moran | |
| 7,076,633 B2 | 7/2006 | Tormasov et al. | |
| 7,137,145 B2 | 11/2006 | Gleichauf | |
| 7,146,233 B2 | 12/2006 | Aziz et al. | |
| 7,159,210 B2 | 1/2007 | Griffin et al. | |
| 2006/0069912 A1* | 3/2006 | Zheng et al. | 713/151 |
| 2007/0107043 A1* | 5/2007 | Newstadt et al. | 726/2 |

\* cited by examiner

*Primary Examiner* — Aravind Moorthy
(74) *Attorney, Agent, or Firm* — Clifton L. Anderson

(57) ABSTRACT

A computer system and method responds to a compromise of a first computer node by automatically hardening one or more uncompromised nodes of the system.

15 Claims, 1 Drawing Sheet

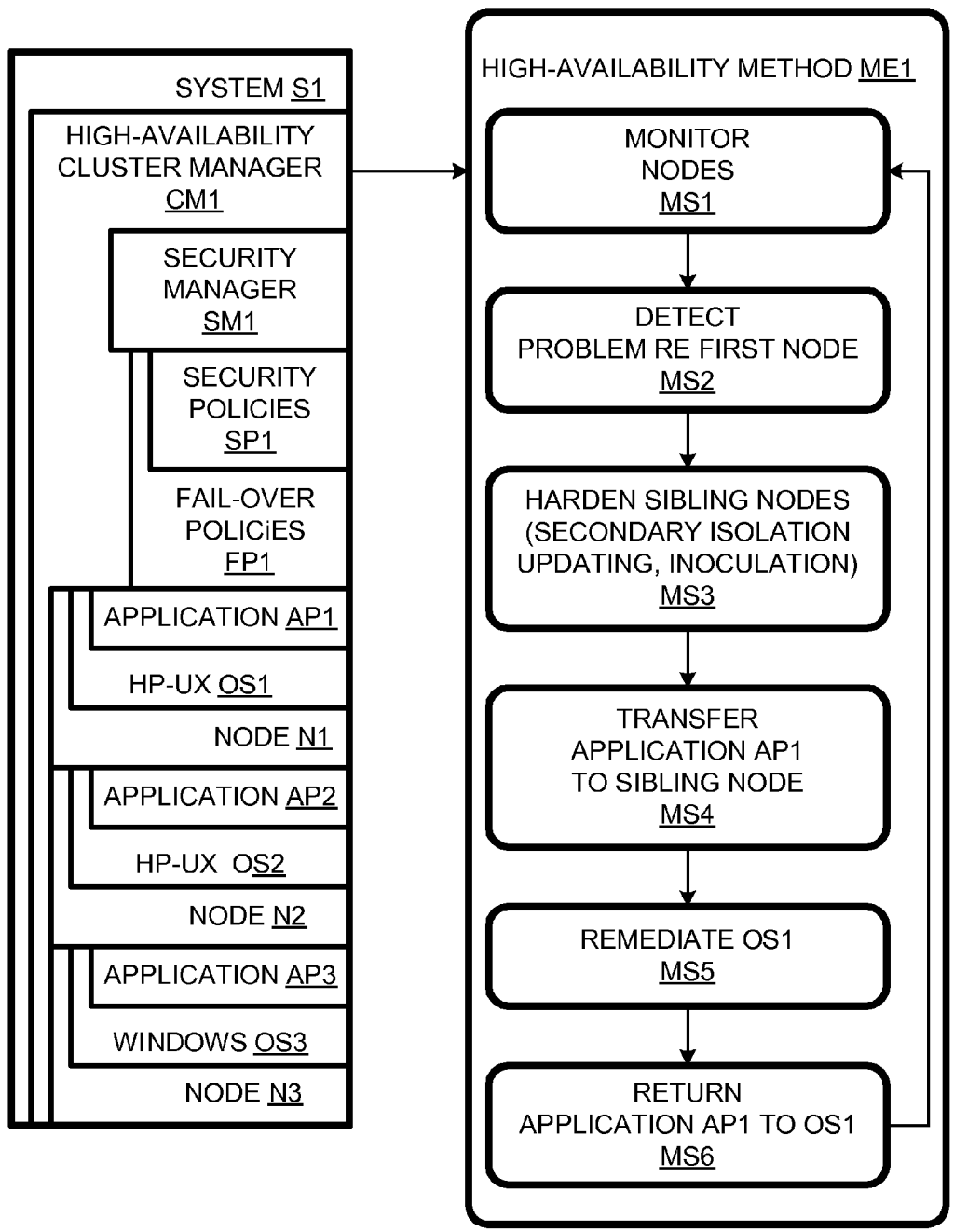

AUTOMATIC HARDENING OF AN UNCOMPROMISED COMPUTER NODE

BACKGROUND OF THE INVENTION

Software vendors often provide updates (e.g., patches and other software and configuration updates) to address security vulnerabilities in software to protect computers from malicious and mischievous intrusions. However, many system administrators or users forgo or at least delay update installations as long as their systems are working properly to avoid a risk of unintended consequences (such as failures caused by installing faulty updates). As a result, their computers may be vulnerable to attack, despite the availability of preventative measures. This vulnerability is especially significant in large computer installations, e.g., data centers or large enterprises, where there are many nodes to attack, and where compromising one node can adversely affect the entire installation.

When a node is compromised, it can be shut down or at least isolated to protect the uncompromised nodes in the system. However, sudden removal of a node from a system can cause a loss of functionality or further problems. U.S. patent application Ser. No. 11/409,351, filed Apr. 21, 2006, discloses a method in which a compromised process or node is quarantined so that some functionality is maintained pending correction of its problem. However, in the ever-escalating battle between security providers and security breachers, further protective measures are desired that help maintain system functionality.

Herein, related art is presented to aid in understanding the present invention. Related art labeled "prior art" is admitted prior art; related art not labeled "prior art" is not admitted prior art.

BRIEF DESCRIPTION OF THE DRAWINGS

The following FIGURE is of an implementation or an embodiment of the invention and is not a depiction of the invention itself.

FIG. 1 is a combination schematic diagram and flow chart in accordance with embodiments of the invention.

DETAILED DESCRIPTION

In the course of the present invention, it was realized that, when one node of a multi-node system is compromised, the cost-versus-benefit tradeoff for implementing security measures for the other nodes may shift from deferring potentially destabilizing updates to favoring stronger security measures when an attack has been detected. Accordingly, the present invention provides for responding to compromise of a node by automatically hardening uncompromised nodes residing in a system containing a compromised node. Herein, a "node" is any managed subunit of a computer system, whether a stand-alone computer in a multi-computer system, or a hard or virtual partition in a stand alone system, or virtual machines in any of the foregoing. Herein, "hardening" is any treatment applied to a node to help it resist unwanted intrusions.

The present invention applies in the context of a system with commonly managed computer nodes. The management can be centralized or distributed. For example, one node within the system can serve as the management node, or the role of management node can migrate from one node to another (e.g., so there is no single point of failure), or the management function can be distributed among nodes at any given time. The nodes of a system can be co-located within a stand-alone unit, distributed among different stand-alone units, which may be located locally or remotely of each other. A node can have a single processor, multiple processors, or, in some technologies, fractional processors. A processor can have one or more cores. Depending on the technology or technologies employed, nodes can be stand-alone systems, hard partitions, virtual partitions, or virtual machines.

Typically, each node runs its own operating system instance—on which applications and even other operating systems can run. The operating systems can be instances of the same operating system, but preferably include instances of distinct operating system families (e.g., Windows and HP-UX). "Relative" is used herein in a broad sense to include all nodes within a commonly managed hierarchy of nodes, e.g., sibling nodes, cousin nodes, uncle/aunt nodes, etc.

For example, in accordance with a first embodiment of the invention, a high-availability computer system includes a cluster manager CM1 and three nodes N1, N2, and N3. Each node has a respective operating system instance OS1, OS2, OS3. In this example, operating system instances OS1 and OS2 are instances of HP-UX (available from Hewlett-Packard Company), while operating system instance OS3 is an instance of Windows Server (available from Microsoft Corporation). In a typical system, there may be more nodes and any combination of operating systems.

It should be noted that the present invention is not limited to high-availability computing systems—e.g., computer systems that provide a high degree of redundancy and other measures to continue functioning despite various types of failures and faults. However, the invention does contribute to high availability in the face of security breaches. In FIG. 1, each node N1-N3 is shown running an application AP1-AP3. These applications can be considered "place holders" in that each node may run several applications, including virtual machines that, in turn, can run applications. In some cases, a node can include or have access to inactive applications that can be activated to implement a migration of an application from one node to another, e.g., in case of a fail-over.

Cluster manager CM1 includes a security manager SM1, which implements security policies SP1 (included in fail-over policies FP1). Note some embodiments, e.g., embodiments that do not involve high availability clustering, a security manager can function without an incorporating cluster manager. Security manager SM1 can snoop to detect security compromises; if a security compromise is detected, security manager SM1 can isolate, install updates on, and inoculate nodes. An exemplary security policy would be "when a first node is compromised, harden relative nodes against the source of the compromise." Thus, if one node is attacked by a virus, updates protecting an operating system from that virus would be applied to the relative nodes. Alternatively or in addition, the relative nodes can be inoculated against the virus, and/or isolated from the compromised node.

In this vein, security manager SM1 implements a method ME1, flow charted in FIG. 1. At method segment MS1, security manager SM1 monitors nodes N1-N3. This monitoring can involve periodically polling nodes for their load levels, e.g., number of users or requests handled, and their utilization levels (processor cycles, network bandwidth, memory). In addition, some security-specific events can be monitored, for example, the presence of certain virus signature files, registry activity, activity of anti-virus software, and firewall notifications.

If the monitoring at method segment MS1 detects, at method segment MS2, a problem at a first node, security manager SM1 may address the problem directly, e.g., by shutting down or isolating a compromised node. Alternatively, if the problem is limited to a particular process running on a node, that process may be quarantined (allowed to run in a manner that it cannot interfere with other processes) as taught in U.S. patent application Ser. No. 11/409,351, filed Apr. 21, 2006.

Method ME1 further provides for hardening relatives of a compromised node. Herein, when the security designed to protect a node from intrusion has been breached, the node is said to be "compromised". Thus, if a virus or hacker has intruded on node N1, method ME1 calls for hardening nodes N2 and node N3 against intrusion.

This hardening can involve secondary isolation, patching, and inoculation. Secondary isolation is isolation of a second node beyond that which is achieved by isolating the first (compromised) node. Patching can involve applying a patch designed to address the current threat to a node not immediately threatened. Inoculation can involve introducing a benign virus or worm to a system that blocks the pathway an intruder would try to use. Of course, the particular form of hardening taken depends not only on the threat, but on the operating system involved. For example, an instance of HP-UX might be hardened differently than an instance of Windows. Also, instances of the same operating systems but with different sets of updates installed might be hardened differently, as determined by security policies SP1.

Some of the functionality of a compromised node may need to be transferred to another node; this transfer can occur at method segment MS4 once the target node or nodes have been hardened at method segment MS3. This transfer can involve transferring a job performed by application A1 to application A2 (where application A2 and application A1 are two instances of the same application software, e.g., they are both Oracle databases (available from Oracle Corporation). Alternatively, the transfer can involve activating an inactive instance of an application or installing and activating an instance of an application on a relative, e.g., sibling node N2 or N3. The job transfer can involve reassigning network storage (not shown) from a compromised node to another. The choice of destination nodes for a transfer is discussed in more detail further below.

In some cases, the functionality of the compromised node may be maintained up to the time of transfer at method segment MS4 by the compromised node itself, e.g., where a problematic process has been allowed to continue running under quarantine. Once the functionality has been transferred, the compromised node can be taken off-line as necessary to remediate, at method segment MS5, the compromised node. The remediation can involve removing unwanted files, repairing damaged files, or more extreme measures like reformatting and reinstalling software and updating to a secure patch level. Once the once-compromised node N1 is restored and hardened, its functionality can be resumed at method segment M6.

In general, the decision whether or not to transfer the functionality from a compromised node to a relative node is determined by security policies SP1. However, in a load-sharing system, isolation of a compromised node might result in a functional shift without intervention of a cluster manager. Once a decision is made to transfer, the selection of a destination node can take into account loads and utilization levels of prospective destination nodes.

In a system, such as system S1, in which nodes can be differentiated by operating system and patch levels, the selection of a destination node or destination nodes can be complex. If an intrusion is dependent on a security vulnerability that is associated with only one operating system, then a transfer to a node with a different operating system may be favored. However, such a transfer may be precluded by compatibility issues; also, if a same-OS node has been adequately hardened, the vulnerability may no longer be an issue.

On the other hand, if the compromise includes dormant aspects that may have compromised relative nodes before hardening, even the hardened same-OS nodes might be more vulnerable than a different OS node. Furthermore, compatibility issues might be addressed by running an instance of the compromised OS on a virtual machine running on the different OS. For example, application AP1 could be run on an HP-UX virtual machine running on Windows on node N3, if this arrangement best addresses security and compatibility issues. These considerations are embodied in security policies SP1, which may differ as a function of the nature of the compromise.

In the illustrated embodiment, nodes N1-N3 are sibling nodes in that they are all descending directly from the level at which the cluster manager works. In another embodiment, there can be multiple levels to the hierarchy, so that the commonly managed nodes include ancestors and their descendants. A compromised node can be on any level of a hierarchy and hardening can be applied to some or all of the relative nodes. Functional transfers can be between sibling nodes, as in the illustrated embodiment, or more distantly related nodes. The invention applies to both high-availability and other computer systems. These and other variations upon and modification to the illustrated embodiment are provided for by the present invention, the scope of which is defined by the following claims.

What is claimed is:

1. A computer system comprising:
at least one processor with one or more cores;
plural computer nodes, said plural nodes including a first node executing a first job on a first instance of a first operating system; and
a security manager configured to,
in the event said security manager detects a security compromise of a first node of said nodes, respond by
automatically hardening an uncompromised second node of said nodes, said second node executing a second instance of said first operating system, and
transferring said job to a third node of said plural nodes so that said first job is executed on an instance of a second operating system different from said first operating system.

2. A computer system as recited in claim 1 wherein said hardening involves applying one or more updates to said second instance of said first operating system.

3. A computer system as recited in claim 1 wherein, after said hardening, said computer system transfers a second job running on said first node to said second node after it is hardened.

4. A computer system as recited in claim 3 wherein, said security manager is configured to harden said first node after said first job is transferred to said third node.

5. A computer system as recited in claim 4 wherein said security manager is configured to transfer said first job back to said first node after said first node is hardened.

6. A system as recited in claim 1 wherein one of the first and second operating systems is a version of Windows, while the other is not.

7. A computer-security method comprising:
executing a first job on a first instance of a first operating system executing on a first node of a computer system, said computer system including at least one processor with one or more cores;

detecting, by said computer system, a security compromise on said first node in response to said detecting, automatically hardening by said computer system of an uncompromised second node of said computer system in response to said detecting, said second node executing a second instance of said first operating system; and transferring said job to a third node so that said job executing on an instance of a second operating system executing on said third node, said second operating system being different from said first operating system.

8. A method as recited in claim 7 wherein said hardening involves installing one or more updates on said second node.

9. A method as recited in claim 7 wherein said hardening involves inoculating said second node against a virus.

10. A method as recited in claim 7 wherein said first and second nodes are sibling nodes.

11. A method as recited in claim 7 further comprising transferring software functionality associated with said first node to said second node after said second node has been hardened.

12. A method as recited in claim 11 further comprising, after said software functionality has been transferred to said second node, remediating said first node so that it is no longer compromised.

13. A method as recited in claim 12 further comprising returning said functionality from said second node to said first node after said first node has been remediated.

14. A method as recited in claim 7 wherein one of the first and second operating systems is a version of Windows, while the other is not.

15. A computer product comprising non-transitory media encoded with code that, when executed by said processor, implements the method of claim 7.

* * * * *

UNITED STATES PATENT AND TRADEMARK OFFICE
CERTIFICATE OF CORRECTION

| | | |
|---|---|---|
| PATENT NO. | : 8,910,289 B1 | Page 1 of 1 |
| APPLICATION NO. | : 11/669208 | |
| DATED | : December 9, 2014 | |
| INVENTOR(S) | : Elliott et al. | |

It is certified that error appears in the above-identified patent and that said Letters Patent is hereby corrected as shown below:

In the drawing

Drawing sheet 1 of 1, line 12, delete "POLICiES" and insert -- POLICIES --, therefor.

Signed and Sealed this
Fifth Day of May, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,910,289 B1 | Page 1 of 1 |
| APPLICATION NO. | : 11/669208 | |
| DATED | : December 9, 2014 | |
| INVENTOR(S) | : Elliott et al. | |

It is certified that error appears in the above-identified patent and that said Letters Patent is hereby corrected as shown below:

On the title page, in the illustrative figure, line 12, delete "POLICiES" and insert -- POLICIES --, therefor.

In the drawing

Drawing sheet 1 of 1, line 12, delete "POLICiES" and insert -- POLICIES --, therefor.

This certificate supersedes the Certificate of Correction issued May 5, 2015.

Signed and Sealed this
Seventh Day of July, 2015

Michelle K. Lee
*Director of the United States Patent and Trademark Office*